United States Patent Office 3,452,398
Patented July 1, 1969

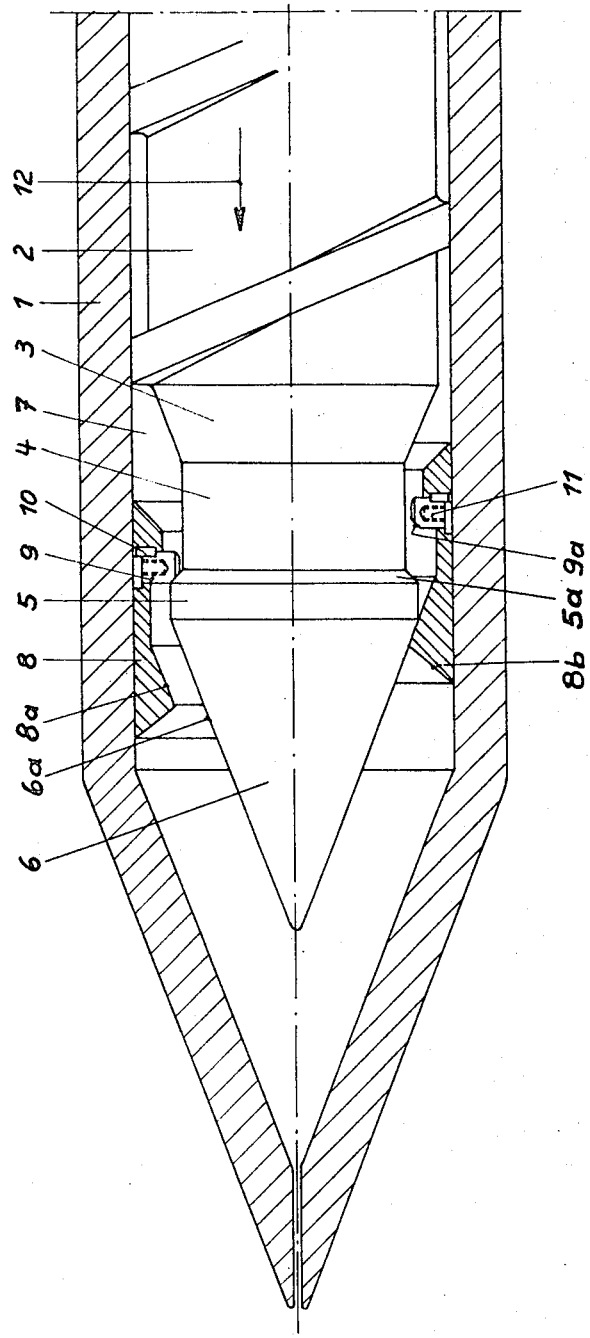

3,452,398
REFLUX LOCK FOR THE WORM HEAD OF HELICAL INJECTION MOLDING MACHINES FOR THE TREATMENT OF THERMOPLASTIC SYNTHETIC MATERIALS
Werner Siegel, Langenfeld, Germany, assignor to Schloemann Aktiengesellschaft, Dusseldorf, Germany, a Germany company
Filed Mar. 8, 1966, Ser. No. 532,649
Claims priority, application Germany, Mar. 10, 1965,
Sch 36,668
Int. Cl. B29f 3/06, 1/03
U.S. Cl. 18—30
5 Claims

ABSTRACT OF THE DISCLOSURE

A reflux lock for the worm head of helical injection molding machines for the treatment of thermoplastic synthetic materials, comprising: a cylinder formed with a nozzle, a worm shaft and worm rotatable and axially displaceable in the cylinder, a locking ring slidable in the cylinder and surrounding but spaced away from the worm shaft, abutments on the locking ring for limiting axial movement of the locking ring relative to the worm shaft, so arranged that when material is being advanced towards the nozzle by rotation of the worm the material pushes the locking ring forward and maintains an open passage for the material between the locking ring and the worm into a space in the cylinder head, but when this cylinder-head space is filled, and the worm is slid bodily forward to expel material from the nozzle, a surface on the leading end of the worm comes into sealing contact with an abutment surface on the locking ring in such a way as to prevent material being forced backwards from the cylinder head space towards the worm threads by the pressure exerted upon it by the advancing worm.

---

This invention relates to a reflux lock for the worm head of helical injection molding machines for the treatment of thermoplastic synthetic materials, in which the plasticising and also the delivery of the synthetic material into the cylinder-head space is effected by rotary motion of the worm, and the injection of the plasticised synthetic material into the injection mould is effected by axial movement of the worm, a locking ring, which surrounds but is spaced away from the worm shaft, bears against the internal wall surface of the cylinder, and is freely reciprocable between abutments, acting as a non-return valve, this locking ring being axially movable over the worm shaft, and being, during the plasticising operation, impelled into its front position (liberation position) by the flow of material, and thus lifted away from the sealing surface of the worm shaft.

Such reflux locks are already known in the most varied constructions. They serve the purpose, in the injection operation, of preventing a reflux of the molten synthetic material out of the cylinder-head space into the rear turns of the worm thread, and thus form an important prerequisite for the correct and satisfactory operation of a helical injection molding machine.

Constructionally the known reflux locks are all designed on the principle of the non-return valve. Thus, in the region of the worm head, a locking body which is axially reciprocable between two abutments is provided, and which, in the plasticizing operation, is moved into a liberation opsition by the material delivered by the worm in the direction of the discharge nozzle, and is moved into a closed position, closing the outlets from the worm threads, during the injection process, by the rearwardly acting back pressure of the plasticized synthetic material located in the cylinder-head space. A frequently occurring disadvantage is that the forms of the worm heads that are constructionally conditioned for the reflux locks do not correspond to the flow behaviour of the synthetic material. Moreover numerous changes of direction of the flow of material are frequently requisite in the region of the reflux lock, in which case so-called dead corners are very liable to occur, in which synthetic material remains behind, and in course of time decomposes, owing to the high temperature prevailing at the worm head.

According to a suggestion that has recently become known, in which, in the region of the reflux lock, satisfactory rheological conditions prevail, the movable locking body is constructed as a ring bearing with its external periphery against the internal wall surface of the cylinder, and lying in a much wider annular groove machined in the worm, and freely displaceable in an axial direction within the annular groove. Furthermore, in the base of the worm, axially extending passage ducts are machined, which are opened or closed according to whether the locking ring assumes its front position or its rear position. A disadvantage inherent in this construction resides in the difficulty of introducing the movable locking ring on to the worm and into the annular groove of the worm. Since the ring is heavily loaded during the injection process, it cannot bear any dividing, by which mounting and dismounting might be simplified. Therefore the only way that remains is to make the tip of the worm, in the region of the annular groove, releasable from the shaft of the worm.

Such a worm tip, releasable from the worm shaft, may in special cases be advantageous, but involves in every instance a considerable increase in the cost of manufacture of the worm. Moreover it has been found in practice that notwithstanding the most accurate fitting, owing to the action of the exceedingly high injection pressure, synthetic material can penetrate into the joint and settle there.

In order to be able to obviate the necessity for dividing the worm tip and the worm into two parts, it has also been proposed to render the front abutment, added to the injection nozzle, for the locking ring, removable from the worm. After removal of the abutment, the locking ring can then be slipped on to the otherwise one-part worm and drawn off from it. Such a releasable abutment, however, involves in its turn assembly edges, in which particles of synthetic material, owing to the high injection pressure that is still operative at the worm head, are very liable to settle, and may subsequently burn.

According to the present invention a reflux lock obviating these disadvantages is provided, which is distinguished from the known appliances by the fact that the sealing surfaces of the locking ring and the worm shaft, as seen in the direction of delivery of the worm, are arranged beyond the abutments limiting the forward movement of the locking ring during the plasticizing operation. This yields the advantage that the necessary assembly edges can be shifted into a region located behind the sealing position, a region in which the high pressure produced by the injection force during the injection process is not operative. Under the vary much lower delivery pressure, however, the penetration of particles of synthetic material into well machined assembly edges need hardly be feared, whereby also the dangerous combusion of material is practically precluded.

According to a preferred constructional example of the invention, the conical surface of the worm tip is at the same time the sealing surface of the worm shaft, and, in co-operation with the sealing surface of the locking ring, the sealing position. The worm head therefore does not need to be specially lengthened for the accommodation of the reflux lock, which is very desirable with the present-day lengths of worm, which are in any case considerable.

Of special advantage is a further feature of the invention, according to which the abutments of the locking ring for the limitation of the forward movement of the ring during the plasticising movement are formed by bolts circumferentially distributed in a rearward evtension of the locking ring, these bolts being held, according to a further feature of the invention, exchangeably in the locking ring. The advantage is that after removing the abutment bolts from the locking ring, one can mount the latter upon the worm or withdraw it therefrom without having to separate the worm and the worm tip from one another, or having to influence unfavorably the highly loaded main sealing surface of the locking ring by an annular disconnection. Furthermore, with the reflux lock according to the invention, it is no longer necessary to provide the worm shaft in the region of the locking ring, or the locking ring itself, with passage ducts parallel to the axis for the material to flow through. For the production of the worm surface, therefore, machining on a lathe is sufficient.

The invention is further explained with reference to the accompanying drawing, which represents a section through an injection cylinder. In the part of this drawing above the centre line the injection cylinder is shown in the position for supplying plasticized material to the cylinder-head space, but in the part below the centre line the injection cylinder is represented in the injection position.

In a usual injection cylinder 1, a worm 2, likewise usual in itself, is so journalled as to be rotatable and axially slidable. This worm, acting both as a plasticising and conveying worm and also as an injection piston, has, at its head, a frusto-conical turning 3, which is followed by a straight cylindrical portion 4, which, by way of a collar 5, of larger diameter again, provided with an inclined inner flank 5a, terminates in the actual worm tip 6. The conically turned surface 3 and the collar 5 provide between them a constriction of the worm 2, whereby a free annular chamber 7 is formed. Here, however, the worm 2 and the worm head 3, 4, 5, 6 are integral with one another.

In the region of the worm head 3, 4, 5, 6 is provided a locking ring 8, surrounding the latter with a space between, and this locking ring, bearing on the internal wall surface of the worm cylinder 1, is so guided as to be freely movable axially in the worm cylinder. On its end facing the injection nozzle the locking ring 8 has a bead-like thickening, and presents in the neighbourhood of this thickening, a substantially triangular cross-section, the one inclined internal surface 8a extending parallel to the conical surface 6a of the worm tip 6, and being adapted to engage the said surface, thus constituting an abutment restricting rearward movement of the locking ring relative to the worm and shutting off communication between the cylinder-head space and the free annular space 7. Towards the rear end of the locking ring 8, which is much flatter in cross-section, are provided a number of radial bores, into which circumferentially distributed bolts 9 are inserted from the exterior. These bolts 9 are each provided with a flange or shoulder 10, which is flush with the external diameter of the locking ring 8. With their heads the bolts 9 project into the free annular space 7, and when the locking ring 8 moves forward they bear against the collar 5 of the worm head, thus constituting an abutment restricting forward movement of the locking ring relative to the worm. Abutment surfaces 9a corresponding to the inclined inner flank 5a of the collar 5 may advantageously be provided on the bolts 9. For fixing the bolts 9, protective pins 10 are employed. To obviate injuries or wear on the abutment collar 5, the bolts 9 preferably consist of a softer material. By means of internal screw threads 11 sunk into the bolts but not passing right through them, these can very easily be drawn out of the locking ring 8. After removal of the bolts 9, the locking ring 8 can be mounted upon the worm 2 or withdrawn from it from the front.

In the plasticising process the synthetic material is delivered by the revolving worm 2 to the injection nozzle in the direction of the arrow 12. By the delivery pressure of the synthetic material the locking ring 8 is displaced towards the injection nozzle, and is caused to abut, with the bolts 9, against the inclined internal surface 5a of the collar 5 of the worm. In this position of the locking ring 8 there is yielded, between the locking ring 8 and the worm head, a free annular gap through which the synthetic material can flow in a substantially straight line into the cylinder-head space in front of the injection nozzle, as shown in the upper half of the drawing.

By the synthetic material accumulating in the cylinder-head space, the worm 2 is pushed back. As soon as a volume of molten synthetic material sufficiently large for the injection operation is present in the cylinder-head space, the rotation of the worm is switched off, and the injection operation is carried out. Upon the axial advance of the worm 2 in the direction of the arrow 12, the locking ring 8 takes up a position, owing to the back pressure of the plasticised material located in the cylinder-head space, with its conical internal surface 8a against the conical surface 6a of the worm tip 6, as shown in the lower half of the drawing, and thus prevents any reflux of the injection material into the rearward turns of the worm thread. The high injection pressure acts upon the worm tip 6 and upon that surface 8b of the locking ring 8 which faces the injection nozzle.

The assembly edges between the locking ring 8 and the bolts 9 lie behind the sealing position, and therefore outside the range in which the high injection pressure is operative. The high injection pressure cannot therefore promote a penetration of particles of synthetic material into the assembly edges. The very much lower delivery pressure in the plasticising operation of the worm is in general not sufficient to effect any penetration of particles of synthetic material into well machined assembly edges. In some cases, however, the assembly edges the locking ring 8 and the bolts 9 may be filled up or soldered with a soft metal, such as lead or tin. In so far as the bolts 9 and the bores that accommodate them in the locking ring 8 have a smooth and well machined surface, so that the metal poured in cannot anchor in the surfaces of the bolts and the ring, the bolts 9 admit of being drawn out comparatively easily, notwithstanding the lining metal.

I claim:

1. A reflux lock for the worm head of a helical injection molding machine for the treatment of thermoplastic synthetic material, comprising: a cylinder, formed with a nozzle for the expulsion of the thermoplastic material and with a cylinder-head space immediately preceding the nozzle, a worm shaft and worm rotatable in the cylinder for plasticizing the thermoplastic material and advancing it into the cylinder-head space, the worm shaft and worm being also axially displaceable in the cylinder for expelling the thermoplastic material through the nozzle, an externally cylindrical locking ring bearing against the internally cylindrical surface of the cylinder and surrounding but spaced away from the worm shaft, this locking ring being axially slidable in the cylinder relatively to the worm shaft, abutment surfaces towards the forward ends of the locking ring and the worm shaft, capable of coming into sealing engagement with one another and thereby limiting rearward movement of the locking ring relative to the worm shaft and preventing thermoplastic material being pushed back from the cylinder-head space towards the worm threads, and abutments towards the rear end of the locking ring, capable of engaging the worm shaft and thereby limiting forward movement of the locking ring relative to the worm shaft.

2. A locking ring as claimed in claim 1, the said abutment surfaces towards the forward ends of the locking ring and the worm shaft consisting of a conical tip on the worm shaft, and an internally frusto-conical surface on the locking ring.

3. A reflux lock for the worm head of a helical injection molding machine for the treatment of thermoplastic synthetic materials, comprising: a cylinder, formed with a nozzle for the expulsion of the thermoplastic material and with a cylinder-head space immediately preceding the nozzle, a worm shaft and worm rotatable in the cylinder for plasticizing the thermoplastic material and advancing it into the cylinder-head space, the worm shaft and worm being also axially displaceable in the cylinder for expelling the thermoplastic material through the nozzle, an externally cylindrical locking ring bearing against the internally cylindrical surface of the cylinder and surrounding but spaced away from the worm shaft, this locking ring being axially slidable in the cylinder relatively to the worm shaft, abutment surfaces towards the forward ends of the locking ring and the worm shaft, capable of coming into sealing engagement with one another and thereby limiting rearward movement of the locking ring relative to the worm shaft and preventing thermoplastic material being pushed back from the cylinder-head space towards the worm threads, an undercut abutment edge on the worm shaft, and abutment bolts peripherally distributed around a rearward portion of the locking ring and projecting radially inwards through the locking ring to engage the said abutment edge.

4. A reflux lock as claimed in claim 2, the bolts being so held in the locking ring as to be withdrawable outwards.

5. A reflux lock as claimed in claim 4, each of the bolts being formed with a tapped blind hole to facilitate withdrawal outwards.

References Cited

UNITED STATES PATENTS

| 3,007,202 | 11/1961 | Wucher | 18—30 |
| 3,131,433 | 5/1964 | Volland | 18—30 |

FOREIGN PATENTS

| 1,190,301 | 3/1959 | France. |

WILBUR L. McBAY, *Primary Examiner.*